June 8, 1965   R. N. JOHNSON ETAL   3,188,099
DEFORMABLE HYDRAULIC SEALS OF ASSOCIATED
BACKING, ANTI-EXTRUSION AND
SEALING RINGS
Filed May 22, 1963
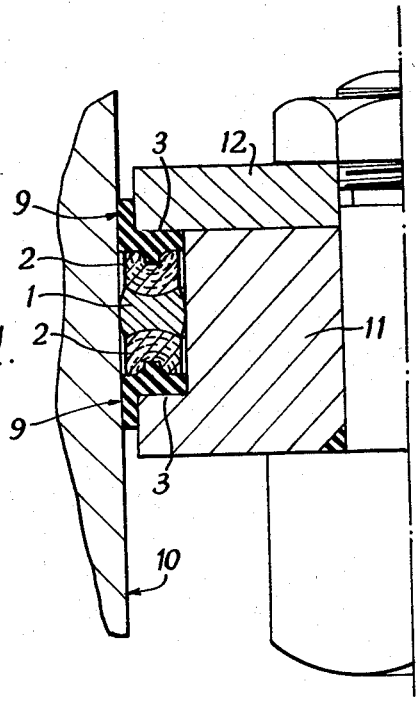
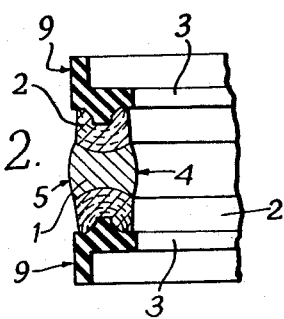
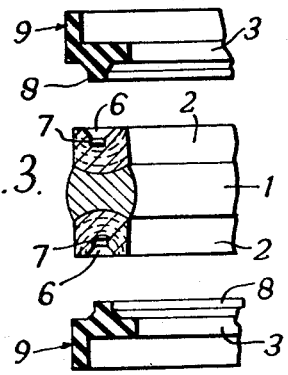
INVENTORS
RICHARD NOEL JOHNSON
ROBERT STANLEY TURNER
BY
Dugger, Braddock,
Johnson & Westman
ATTORNEYS 3,188,099
DEFORMABLE HYDRAULIC SEALS OF ASSOCIATED BACKING, ANTI-EXTRUSION AND SEALING RINGS
Richard Noel Johnson, Stoughton, Guildford, and Robert Stanley Turner, Knaphill, Woking, England, assignors to James Walker & Company Limited, Woking, England, a corporation of Great Britain
Filed May 22, 1963, Ser. No. 282,375
Claims priority, application Great Britain, June 8, 1962, 22,301/62
5 Claims. (Cl. 277—188)

This invention relates to sealing or packing rings of the kind comprising an annular sealing ring of readily deformable material backed on one side or both sides by an annular ring part of less deformable material.

The above kind of sealing or packing ring is commonly used in a gland assembly closely surrounding a moving member such as a reciprocating shaft or mounted within a groove in the head of a hydraulic piston working within a cylinder, with each ring of less deformable material functioning to prevent or hinder extrusion of the sealing ring or readily deformable material through available clearance spaces in the gland or piston and cylinder assemblies when the ring is subjected to a sufficiently heavy hydraulic pressure.

In practice, in rings of the kind to which the present invention relates, the sealing component of readily deformable material is usually made from natural or synthetic rubber and each anti-extrusion ring of rubberized fabric.

The object of the present invention is a sealing or packing ring of the above kind having improved means for causing the anti-extrusion rings to expand radially in its section under the hydraulic pressure thereby automatically to vary the degree to which they will act to prevent or hinder extrusion of the sealing ring in accordance with the hydraulic pressure.

Broadly the present invention consists in a sealing or packing ring of the kind specified which has an annular backing ring of relatively hard material associated with the outer transverse face of one or each anti-extrusion ring, each said backing ring having a wedge-shape annular rib projecting axially from its inner transverse face adapted to produce radial expansion of the opposing anti-extrusion ring in its section when the outer transverse face of said backing ring is under hydraulic pressure whereby the action of the anti-extrusion ring to prevent or hinder extrusion of the material composing the softer sealing ring is automatically increased with an increase in the hydraulic load.

In the preferred construction the wedge-shape rib on each backing edge engages in a groove of corresponding section formed during moulding in the outer transverse face of each ant-extrusion ring.

A sealing or packing ring according to one embodiment of the present invention comprises a unitary sandwich structure faced on both transverse sides with a backing ring as aforesaid. In such preferred embodiment the sandwich structure is composed of three annular rings comprising an intermediate ring of softer material such as rubber sandwiched between and bonded to anti-extrusion rings of harder material such as rubberized fabric, said intermediate ring extending radially inwards and radially outwards beyond the inner and outer circumferences of the anti-extrusion rings to provide an internal sealing surface and an external sealing surface.

In this embodiment the anti-extrusion rings are each formed during moulding with a continuous groove to receive the rib of a backing ring, said groove having an outer V-shape mouth with inwardly tapering sides leading into an inner portion having straight or parallel sides. The ribs on the backing rings are shaped correspondingly so as to fit snugly into said grooves.

When the above sealing ring is under hydraulic pressure within its housing the pressuring acting on the outer transverse face of one of the backing rings will act with the backing ring on the opposite side which is supported by a side of the housing, to compress the intermediate sandwich structure and cause the wedge-shape portion on the rib of the backing ring on the side remote from the pressure to be forced into the groove to cause the material on opposite sides of the groove to expand thereby to reduce the clearance between the inner and outer circumferences of the anti-extrusion ring and the adjacent confining walls of the gland or piston assembly.

In this embodiment of the invention each backing ring is formed with an integral axially extending extension to provide a bearing surface in the form of a ring providing in the case of a piston assembly, a close working fit within the cylinder, and in the case of a gland assembly, a close working fit on and around the piston rod or ram.

The backing rings are composed of a relatively rigid and non-deformable material such as nylon, polytetrafluoroethylene or a resin bonded fabric.

To assist in a proper understanding of the present invention a sealing or packing ring according to the above embodiment of the invention will now be described by the aid of the accompanying drawings in which:

FIG. 1 is a view in section showing the piston head of a hydraulic ram fitted with a sealing ring assembly according to the invention.

FIG. 2 is a view in section and to a larger scale of the sealing ring assembly of FIG. 1 showing the same removed from the piston head.

FIG. 3 is an exploded view, also in section, showing the backing rings separated from the anti-extrusion rings.

The seal illustrated in the drawings is made up from an annular sandwich structure comprising an annular intermediate part 1, of softer material such as rubber sandwiched between and bonded to annular anti-extrusion ring portions 2 of harder and relatively non-extensible material such as rubberised fabric, said unitary sandwich structure having an annular backing ring 3 of hard material seating against the outer face of each anti-extrusion ring.

The annular intermediate part 1 in the sandwich structure extends radially inwards and radially outwards beyond the inner and outer circumferences of the anti-extrusion rings 2 to provide an internal sealing surface 4 and an external sealing surface 5.

In the present example each anti-extrusion ring 2 is moulded with a continuous groove in its outer face, each said groove having an annular V-shape mouth 6 with inwardly tapering sides terminating in an inner portion 7 with non-parallel or parallel sides. These continuous grooves in a complete sealing ring are engaged by correspondingly shaped ribs 8 integral with and extending axially outwards from the inner radial faces of the backing rings 3.

The backing rings 3 may be freely separable from the anti-extrusion rings 2, or they may be bonded together by their opposing faces or the grooves in the anti-extrusion rings and the ribs 8 may be shaped so that the ribs 8 and the said grooves will dovetail when the ribs are pressed fully home into the grooves and thereby only be separable by force.

The backing rings 3 in the present example are formed with integral extensions to provide bearing faces 9 which are a close working fit within a cylinder represented in FIG. 1 as the surface 10, in the case of a piston and cylinder assembly.

In the case of a gland assembly the extensions 9 will be on the inner circumference of the backing rings and the bearing faces will be a close working fit around the circumferences of a shaft.

In FIG. 1 of the drawings the assembled sealing ring of the present invention is shown with the backing rings fitting closely both axially and radially within a housing formed by a portion of the piston head 11 of reduced diameter and a detachable closure plate 12.

In the embodiment illustrated the whole of the sealing is effected by the sealing surfaces 4 and 5, and by selecting as the anti-extrusion rings 2 those of suitably less radial width than that of the intermediate softer ring so that they do not make sealing contact with the housing and shaft or cylinder, friction is reduced to a minimum.

Further in being symmetrical, a sealing ring as illustrated can be fitted either end first into its housing as it is immaterial which end faces the pressure.

Also the present seal provides an initial slack-fluid seal due to the natural interference the sealing surfaces 4, 5 make with the surfaces to be sealed. Pressure sealing is automatically achieved by deformation of the softer ring 1 under the hydraulic load, and the action of the anti-extrusion rings 2 to prevent or hinder extrusion of the material composing the ring 1 is automatically increased with an increase in the hydraulic load.

An improved seal according to the present invention is not essentially confined to a structure as above described. It may be modified in many respects, including the following:

(1) With the object of reducing cost the anti-extrusion rings may have a radial width less than the full radial width of the seal so as to reside on one side of the wedge-shape rib of each backing ring, the space on the opposite side being filled by an annular section formed by moulding the intermediate sealing ring 1 with a lateral extension on one or both sides of its radial axis. Such a modified form of seal should be disposed in an assembly with the anti-extrusion rings closely adjacent to the movable shaft in the case of a gland assembly and to the cylinder wall in the case of a piston head assembly.

(2) The extenisons having the bearing faces 9 on the backing rings 3 may be omitted, and, if necessary, the axial thickness of the backing ring may be increased to provide sufficient bearing surface.

(3) The backing rings 3 may be endless or split, preferably split.

(4) The backing rings 3 may be loose and not integrally united with the other components of the seal, in which case the correct location of the intermediate sandwich of the seal will be effected by an engagement between the wedge-shape rib of the backing ring and the annular groove in the anti-extrusion ring.

(5) The intermediate annular sealing ring 1 of softer material may be made of any suitable and deformable material such as natural or synthetic rubber or a suitably deformable plastic material.

(6) The rib 8 on each backing ring 3 and the co-acting groove in the side face of each anti-extrusion ring may be shaped to provide a separable or other interlock when interengaged.

For example the rib and the groove may be shaped to provide a dovetail or each rib may be extended beyond the wedge-shape portion to form a tenon and the groove in the opposing side of the seal correspondingly shaped to form a mortice.

What we claim is:

1. A sealing or packing ring which comprises a unitary sandwich structure faced on both transverse sides by a backing ring of relatively hard and inextensible material, said sandwich structure being composed of an intermediate annular sealing ring of softer material sandwiched between and bonded to annular anti-extrusion rings of harder material, said intermediate sealing ring extending radially inwards and radially outwards beyond the inner and outer circumferences of the anti-extrusion rings to provide an internal sealing surface and an external sealing surface, and each said backing ring having a wedge-shape annular rib projecting axially from its inner transverse face and engageable with a correspondingly shaped groove in the opposing transverse face of the associated anti-extrusion ring to produce radial expansion of the anti-extrusion ring in its section when the backing ring is under hydraulic pressure on its outer transverse face.

2. An annular seal or packing ring adapted for use with a piston cylinder combination including a cylinder wall having an inner surface portion, a gland assembly including a shaft having an outer peripheral surface portion and the like comprising at least one anti-extrusion ring having an outer transverse face and an inner transverse face, an annular sealing ring of softer material than the anti-extrusion ring adjacent the inner face of the anti-extrusion ring and an annular backing ring for each anti-extrusion ring having an inner transverse face associated with said outer transverse face, said backing ring having an integral axially extending extension forming a surface adjacent said surface portion and of a diameter to make a bearing contact with said surface portion, and a wedge-shape annular rib projecting axially from its inner transverse face adapted to produce radial expansion of the associated anti-extrusion ring in its section when the backing ring is under hydraulic pressure on its outer transverse face whereby the action of the anti-extrusion ring to prevent or hinder extrusion of the material composing the sealing ring is automatically increased with an increase in the hydraulic load.

3. An annular seal or packing ring adapted for use with a piston cylinder combination including a cylinder wall having an inner surface portion, a gland asembly including a shaft having an outer peripheral surface portion and the like, comprising at least one anti-extrusion ring having an outer transverse race and an inner transverse face, an annular sealing ring of softer material than the anti-extrusion ring adjacent the inner face of the anti-extrusion ring, and an annular backing ring for each anti-extrusion ring having an inner transverse face associated with said outer transverse face, said backing ring having a wedge-shape annular rib projecting axially from its inner transverse face adapted to produce radial expansion of the associated anti-extrusion ring in its section when the backing ring is under hydraulic pressure on its outer transverse face whereby the action of the anti-extrusion ring to prevent or hinder extrusion of the sealing ring is automatically increased with an increase in hydraulic load, said rib being composed of an inner wedge portion having oppositely inclining surfaces and an outer straight portion having surfaces which are substantially parallel to each other.

4. An annular seal or packing ring adapted for use with a piston cylinder combination including a cylinder wall having an inner surface portion, a gland assembly including a shaft having an outer peripheral surface portion and the like, comprising at least one anti-extrusion ring having an outer transverse face and an inner transverse face, an annular sealing ring of softer material than the anti-extrusion ring adjacent the innerface of the anti-extrusion ring, and an annular backing ring for each anti-extrusion ring having an inner transverse face associated with said outer transverse face, said backing ring having a wedge-shape annular rib projecting axially from its inner transverse face adapted to produce radial expansion of the associated anti-extrusion ring in its section when the backing ring is under hydraulic pressure on its outer transverse face whereby the action of the anti-extrusion ring to prevent or hinder extrusion of the sealing ring is automatically increased with an increase in hydraulic load, said backing ring being detachably engageable with the anti-extrusion ring.

5. A sealing or packing ring as in claim 4 wherein the backing ring is detachably engageable with the anti-extrusion ring by means of the rib on the backing ring being adapted to engage in and releasably interlock with a suitably shaped groove in the associated anti-extrusion ring.

References Cited by the Examiner

UNITED STATES PATENTS

| | | | |
|---|---|---|---|
| 2,815,973 | 12/57 | Jackson | 277—188 |
| 2,841,429 | 7/58 | McCuistion | 277—188 X |
| 3,009,721 | 11/61 | Newton | 277—188 |
| 3,071,386 | 1/63 | Scannell | 277—188 X |

FOREIGN PATENTS 547,268  10/57  Canada.

LEWIS J. LENNY, *Primary Examiner.*

SAMUEL ROTHBERG, *Examiner.*